(12) United States Patent
Farrugia et al.

(10) Patent No.: US 8,247,156 B2
(45) Date of Patent: Aug. 21, 2012

(54) PROCESSES FOR PRODUCING POLYESTER LATEXES WITH IMPROVED HYDROLYTIC STABILITY

(75) Inventors: Valerie M. Farrugia, Oakville (CA); Kimberly D. Nosella, Mississauga (CA); Rosa M. Duque, Brampton (CA)

(73) Assignee: Xerox Corporation, Norwalk, CT (US)

(*) Notice: Subject to any disclaimer, the term of this patent is extended or adjusted under 35 U.S.C. 154(b) by 32 days.

(21) Appl. No.: 12/878,356

(22) Filed: Sep. 9, 2010

(65) Prior Publication Data

US 2012/0064453 A1    Mar. 15, 2012

(51) Int. Cl.
G03G 5/00 (2006.01)
(52) U.S. Cl. ............ 430/137.11; 430/137.1; 430/137.14
(58) Field of Classification Search ................ 430/108.1, 430/109.4, 137.1, 137.14, 137.11; 524/195
See application file for complete search history.

(56) References Cited

U.S. PATENT DOCUMENTS

| | | |
|---|---|---|
| 3,590,000 A | 6/1971 | Palermiti et al. |
| 3,800,588 A | 4/1974 | Larson et al. |
| 3,933,954 A | 1/1976 | Gebhard et al. |
| 4,056,653 A | 11/1977 | Gebhard et al. |
| 4,113,676 A | 9/1978 | Niederst et al. |
| 4,298,672 A | 11/1981 | Lu |
| 4,338,390 A | 7/1982 | Lu |
| 5,278,020 A | 1/1994 | Grushkin et al. |
| 5,290,654 A | 3/1994 | Sacripante et al. |
| 5,302,486 A | 4/1994 | Patel et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,354,804 A | 10/1994 | Inada et al. |
| 5,364,729 A | 11/1994 | Kmiecik-Lawrynowicz et al. |
| 5,366,841 A | 11/1994 | Patel et al. |
| 5,370,963 A | 12/1994 | Patel et al. |
| 5,399,597 A | 3/1995 | Mandel et al. |
| 5,403,693 A | 4/1995 | Patel et al. |
| 5,405,728 A | 4/1995 | Hopper et al. |
| 5,418,108 A | 5/1995 | Kmiecik-Lawrynowicz et al. |
| 5,496,676 A | 3/1996 | Croucher et al. |
| 5,501,935 A | 3/1996 | Patel et al. |
| 5,527,658 A | 6/1996 | Hopper et al. |
| 5,548,004 A | 8/1996 | Mandel et al. |
| 5,585,215 A | 12/1996 | Ong et al. |
| 5,650,255 A | 7/1997 | Ng et al. |
| 5,650,256 A | 7/1997 | Veregin et al. |
| 5,723,253 A | 3/1998 | Higashino et al. |
| 5,744,520 A | 4/1998 | Kmiecik-Lawrynowicz et al. |
| 5,747,215 A | 5/1998 | Ong et al. |
| 5,763,133 A | 6/1998 | Ong et al. |
| 5,766,818 A | 6/1998 | Smith et al. |

(Continued)

FOREIGN PATENT DOCUMENTS

WO    WO 98/45356    10/1998

(Continued)

*Primary Examiner* — Mark F. Huff
*Assistant Examiner* — Stewart Fraser
(74) *Attorney, Agent, or Firm* — MDIP LLC

(57) ABSTRACT

A process for making a latex emulsion suitable for use in a toner composition includes contacting at least one crystalline polyester resin with an organic solvent and a stabilizing agent to form a resin mixture, adding a neutralizing agent, and deionized water to the resin mixture, removing the solvent from the formed latex, and continuously recovering latex particles.

20 Claims, 3 Drawing Sheets

U.S. PATENT DOCUMENTS

| | | | |
|---|---|---|---|
| 5,804,349 A | 9/1998 | Ong et al. | |
| 5,827,633 A | 10/1998 | Ong et al. | |
| 5,840,462 A | 11/1998 | Foucher et al. | |
| 5,853,943 A | 12/1998 | Cheng et al. | |
| 5,853,944 A | 12/1998 | Foucher et al. | |
| 5,863,698 A | 1/1999 | Patel et al. | |
| 5,869,215 A | 2/1999 | Ong et al. | |
| 5,902,710 A | 5/1999 | Ong et al. | |
| 5,910,387 A | 6/1999 | Mychajlowskij et al. | |
| 5,916,725 A | 6/1999 | Patel et al. | |
| 5,919,595 A | 7/1999 | Mychajlowskij et al. | |
| 5,925,488 A | 7/1999 | Patel et al. | |
| 5,977,210 A | 11/1999 | Patel et al. | |
| 5,994,020 A | 11/1999 | Patel et al. | |
| 6,054,242 A | 4/2000 | Okutani et al. | |
| 6,063,827 A | 5/2000 | Sacripante et al. | |
| 6,080,807 A | 6/2000 | Campbell | |
| 6,214,507 B1 | 4/2001 | Sokol et al. | |
| 6,444,737 B1 | 9/2002 | Rayner | |
| 6,512,024 B1 | 1/2003 | Lundgard et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 7,064,156 B2 | 6/2006 | Rink et al. | |
| 7,385,001 B2 | 6/2008 | Shim et al. | |
| 2002/0074681 A1 | 6/2002 | Lundgard et al. | |
| 2006/0222991 A1 | 10/2006 | Sacripante et al. | |
| 2006/0257777 A1* | 11/2006 | Matsumura et al. | 430/109.4 |
| 2008/0090163 A1* | 4/2008 | Agur et al. | 430/108.1 |
| 2008/0107989 A1 | 5/2008 | Sacripante et al. | |
| 2008/0153027 A1 | 6/2008 | Veregin et al. | |
| 2009/0208864 A1 | 8/2009 | Zhou et al. | |
| 2009/0246680 A1 | 10/2009 | Chung et al. | |
| 2009/0263740 A1 | 10/2009 | Lai et al. | |
| 2010/0143839 A1 | 6/2010 | Nosella et al. | |

FOREIGN PATENT DOCUMENTS

| | | |
|---|---|---|
| WO | WO 00/17256 | 3/2000 |

* cited by examiner

US 8,247,156 B2

PROCESSES FOR PRODUCING POLYESTER LATEXES WITH IMPROVED HYDROLYTIC STABILITY

TECHNICAL FIELD

The present disclosure relates to processes for producing resin emulsions useful in producing toners. More specifically, more efficient solvent-based processes are provided for emulsifying polyester resins.

BACKGROUND

Numerous processes are within the purview of those skilled in the art for the preparation of toners. Emulsion aggregation (EA) is one such method. Emulsion aggregation toners may be used in forming print and/or electrophotographic images. Emulsion aggregation techniques may involve the formation of a polymer emulsion by heating a monomer and undertaking a batch or semi-continuous emulsion polymerization, as disclosed in, for example, U.S. Pat. No. 5,853,943, the disclosure of which is hereby incorporated by reference in its entirety. Other examples of emulsion/aggregation/coalescing processes for the preparation of toners are illustrated in U.S. Pat. Nos. 5,902,710; 5,910,387; 5,916,725; 5,919,595; 5,925,488, 5,977,210, 5,994,020, and U.S. Patent Application Publication No. 2008/0107989, the disclosures of each of which are hereby incorporated by reference in their entirety.

Polyester toners have been prepared utilizing amorphous and crystalline polyester resins as illustrated, for example, in U.S. Patent Application Publication No. 2008/0153027, the disclosure of which is hereby incorporated by reference in its entirety. The incorporation of these polyesters into the toner requires that they first be formulated into emulsions prepared by solvent containing batch processes, for example solvent flash emulsification and/or solvent-based phase inversion emulsification (PIE). In both cases, organic solvents, such as ketones or alcohols, have been used to dissolve the resins.

Polyester emulsions made via PIE may show polymer degradation over time. Polymers containing hydrolysable groups, for example hydrolysable carboxylic ester groups in polyester emulsions used for EA toners, have poor shelf life stability due to the water environment itself, biocides, pH conditions, ionic strength, and other additives such as surfactants and buffers. Hydrolyzed residual monomers and/or pendant acid groups on the polymer backbone resulting from polymer hydrolysis and/or polymerization of hydrolyzed monomer can become an enabler to further hydrolysis as the emulsion becomes more and more unstable.

A process of pH adjustment of polyester emulsions has been utilized to stabilize the emulsion and deter polymeric degradation over time as illustrated in U.S. Patent Application Publication No. 2010/0143839, the entire disclosure of which is hereby incorporated by reference in its entirety.

Methods which minimize the degradation and improve the shelf life of a resin emulsion prior to toner manufacture remain desirable.

SUMMARY

Processes of the present disclosure include contacting at least one polyester resin with at least one organic solvent and a stabilizing agent comprising a carbodiimide; mixing the mixture; contacting the mixture with a neutralizing agent to form a neutralized mixture; contacting the neutralized mixture with de-ionized water to form an emulsion; and recovering latex particles from the emulsion.

Processes of the present disclosure also include contacting at least one crystalline polyester resin and an optional amorphous resin with at least one organic solvent, and a stabilizing agent selected from the group consisting of poly(nitrilomethanetetraylnitrilo (2,4,6-tris(1-methylethyl)-1,3-phenylene), tetraisopropyldiphenylcarbodiimide, 2,2',6,6'-tetraisopropyldiphenyl carbodiimide, N,N'-dicyclohexylcarbodiimide, N,N'-diisopropylcarbodiimide, 1-ethyl-3-(3-dimethylaminopropyl)carbodiimide, tetramethylxylylene carbodiimide, diisopropylcarbodiimide, methyl-tert-butyl-carbodiimide, dicyclohexylcarbodiimide, diphenyl-carbodiimide, di-p-tolyl-carbodiimide, 2,2'-dimethyl-diphenyl carbodiimide, 2,2'-diisopropyl-diphenyl carbodiimide, 2-dodecyl-2'-n-propyl-diphenyl carbodiimide, 2,2'-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyl-diphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetraethyl-dicyclohexyl carbodiimide and 2,2'-dichlorodicyclohexyl carbodiimide, 2,2'-dicarbethoxy-diphenyl carbodiimide, 2,2'-dicyano-diphenyl carbodiimide, and combinations thereof, to form a resin mixture; melt mixing the mixture; contacting the mixture with a neutralizing agent to form a neutralized mixture; contacting the neutralized mixture with de-ionized water to form an emulsion; continuously recovering latex particles from the emulsion; and contacting the latex particles with an optional colorant, an optional wax, and an amorphous polyester resin to form toner particles.

The present disclosure provides a toner process which includes contacting at least one crystalline polyester resin and optional amorphous resins with at least one organic solvent, and a stabilizing agent including a carbodiimide and is selected from the group consisting of poly(nitrilomethanetetraylnitrilo (2,4,6-tris(1-methylethyl)-1,3-phenylene), tetraisopropyldiphenylcarbodiimide, 2,2',6,6'-tetraisopropyldiphenyl carbodiimide, N,N'-dicyclohexylcarbodiimide, N,N'-diisopropylcarbodiimide, 1-ethyl-3-(3-dimethylaminopropyl)carbodiimide, tetramethylxylylene carbodiimide, diisopropylcarbodiimide, methyl-tert-butyl-carbodiimide, dicyclohexyl-carbodiimide, diphenyl-carbodiimide, di-p-tolyl-carbodiimide, 2,2'-dimethyl-diphenyl carbodiimide, 2,2'-diisopropyl-diphenyl carbodiimide, 2-dodecyl-2'-n-propyl-diphenyl carbodiimide, 2,2'-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyldiphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetra-ethyl-dicyclohexyl carbodiimide and 2,2'-dichlorodicyclohexyl carbodiimide, 2,2'-dicarbethoxy-diphenyl carbodiimide, 2,2'-dicyanodiphenyl carbodiimide, and combinations thereof, to form a stabilized mixture; mixing the mixture; contacting the stabilized mixture with a neutralizing agent to form a neutralized mixture; contacting the neutralized mixture with de-ionized water to form an emulsion; distilling the organic solvent from the emulsion; recovering latex particles from the emulsion; and contacting the latex particles with an optional colorant, an optional wax, an optional additive, and an amorphous polyester resin to form toner particles.

BRIEF DESCRIPTION OF DRAWINGS

Various embodiments of the present disclosure will be described herein below with reference to the figures wherein.

DETAILED DESCRIPTION

Figure 1:
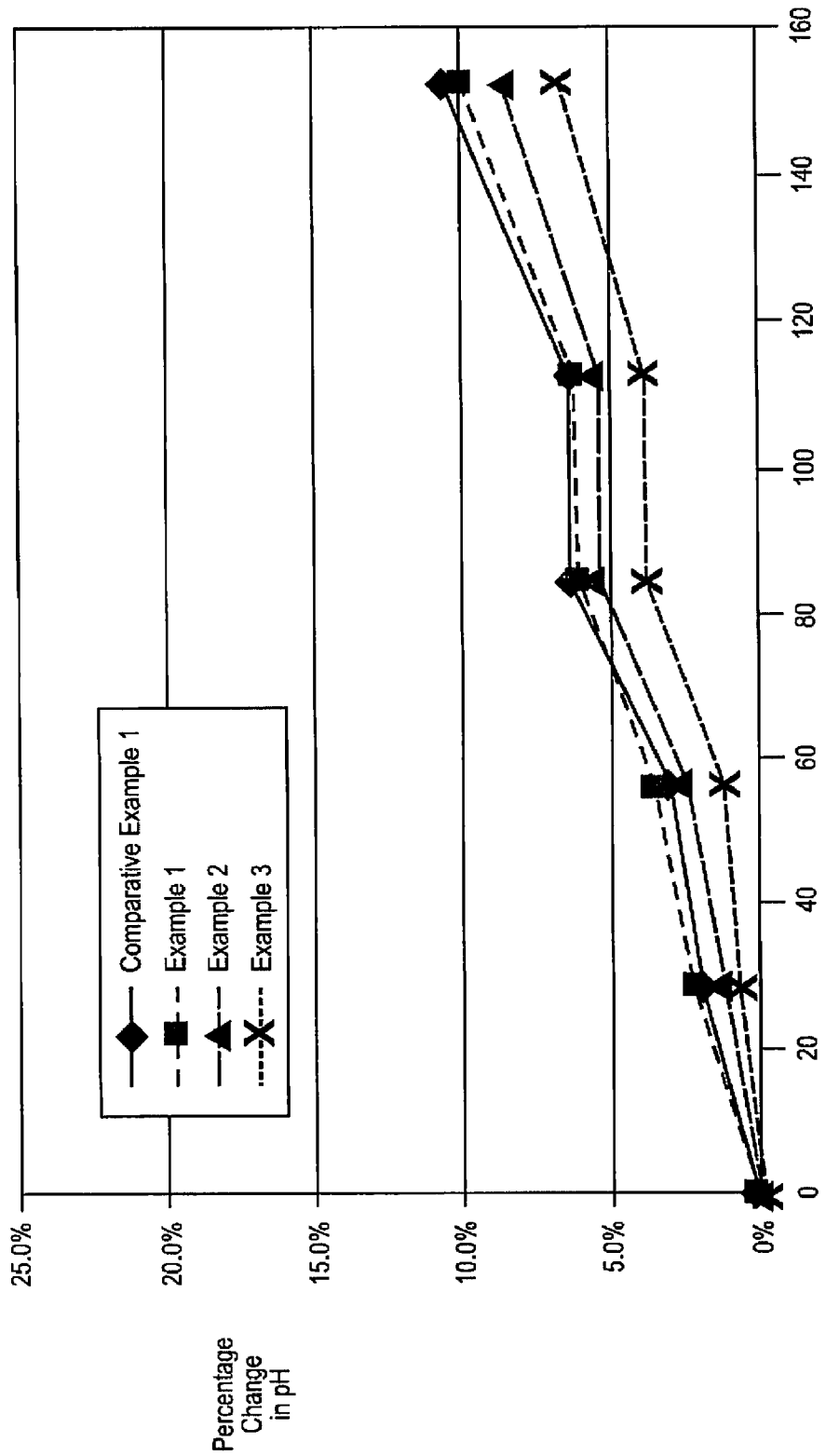
FIG. 1 is a graph depicting hydrolytic stability of crystalline polyester emulsions based on a percentage change in pH in accordance with Example 1 of the present disclosure.

In embodiments, the present disclosure provides solvent based processes for forming high yield polyester latexes which may be utilized in forming a toner having an improved shelf life.

In embodiments, the present disclosure provides methods for stabilizing aqueous emulsions of polyester compositions for EA toner against degradation, which includes the addition of at least one stabilizing agent. In embodiments, the present disclosure provides an EA toner including a stabilizing agent such as, for example, a carbodiimide.

In accordance with the present disclosure, a method for the emulsification of polyester resins is provided wherein a stabilizing agent is dissolved in a solvent with the polyester resin and water. The addition of at least two solvents, in embodiments methyl ethyl ketone (MEK) and isopropanol (IPA), to a polyester resin allows the polyester resin to be emulsified in a solvent process. Solvents are added to permit the necessary reorientation of chain ends to stabilize and form particles which lead to the formation of stable latexes without surfactant.

In embodiments, the stabilizing agent may be added neat into the melt form of the polymer and cooled and grinded for PIE. In embodiments, the stabilizing agent may be added in an amount from about 0.01 to about 20 weight percent based on the polymer solids, in embodiments, from about 0.1 to about 10.0 weight percent based on the polymer solids.

Resins

Any resin may be utilized in forming a latex emulsion of the present disclosure. In embodiments, the resins may be an amorphous resin, a crystalline resin, and/or a combination thereof. In further embodiments, the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol and the like including their structural isomers. The aliphatic diol may be, for example, selected in an amount from about 40 to about 60 mole percent, in embodiments from about 42 to about 55 mole percent, in embodiments from about 45 to about 53 mole percent, and a second diol can be selected in an amount from about 0 to about 10 mole percent, in embodiments from about 1 to about 4 mole percent of the resin.

Examples of organic diacids or diesters including vinyl diacids or vinyl diesters selected for the preparation of the crystalline resins include oxalic acid, succinic acid, glutaric acid, adipic acid, suberic acid, azelaic acid, sebacic acid, fumaric acid, dimethyl fumarate, dimethyl itaconate, cis, 1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof. The organic diacid may be selected in an amount of, for example, in embodiments from about 40 to about 60 mole percent, in embodiments from about 42 to about 52 mole percent, in embodiments from about 45 to about 50 mole percent, and a second diacid can be selected in an amount from about 0 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), polypropylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), polypropylene-succinimide), and poly(butylene-succinimide).

The crystalline resin may be present, for example, in an amount from about 1 to about 85 percent by weight of the toner components, in embodiments from about 5 to about 50 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 3 to about 4.

Examples of diacids or diesters including vinyl diacids or vinyl diesters utilized for the preparation of amorphous polyesters include dicarboxylic acids or diesters such as terephthalic acid, phthalic acid, isophthalic acid, fumaric acid, trimellitic acid, dimethyl fumarate, dimethyl itaconate, cis, 1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacids or diesters may be present, for example, in an amount from about 40 to about 60 mole percent of the resin, in embodiments from about 42 to about 52 mole percent of the resin, in embodiments from about 45 to about 50 mole percent of the resin.

Examples of diols which may be utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl)oxide, dipropylene glycol, dibutylene, and combinations thereof. The amount of organic diols selected can vary, and may be present, for example, in an amount from about 40 to about 60 mole percent of the resin, in embodiments from about 42 to about 55 mole percent of the resin, in embodiments from about 45 to about 53 mole percent of the resin.

Polycondensation catalysts which may be utilized in forming either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

In embodiments, as noted above, an unsaturated amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

In embodiments, a suitable polyester resin may be an amorphous polyester such as a poly(propoxylated bisphenol A co-fumarate) resin having the following formula (I):

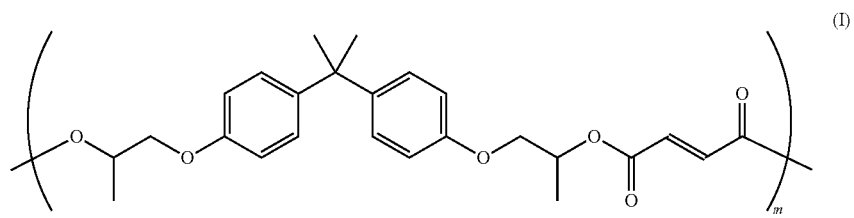

wherein m may be from about 5 to about 1000. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII from Resana S/A Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, N.C., and the like.

Suitable crystalline resins which may be utilized, optionally in combination with an amorphous resin as described above, include those disclosed in U.S. Patent Application Publication No. 2006/0222991, the disclosure of which is hereby incorporated by reference in its entirety. In embodiments, a suitable crystalline resin may include a resin formed of ethylene glycol and a mixture of dodecanedioic acid and fumaric acid co-monomers with the following formula:

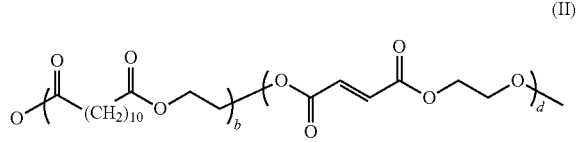

wherein b is from about 5 to about 2000 and d is from about 5 to about 2000.

The amorphous resin may be present, for example, in an amount from about 5 to about 95 percent by weight of the toner components, in embodiments from about 30 to about 80 percent by weight of the toner components. In embodiments, the amorphous resin or combination of amorphous resins utilized in the latex may have a glass transition temperature from about 30° C. to about 80° C., in embodiments from about 35° C. to about 70° C. In further embodiments, the combined resins utilized in the latex may have a melt viscosity from about 10 to about 1,000,000 Pa*S at about 130° C., in embodiments from about 50 to about 100,000 Pa*S.

One, two, or more resins may be used. In embodiments, where two or more resins are used, the resins may be in any suitable ratio (e.g., weight ratio) such as for instance from about 1% (first resin)/99% (second resin) to about 99% (first resin)/1% (second resin), in embodiments from about 10% (first resin)/90% (second resin) to about 90% (first resin)/10% (second resin).

For example, in embodiments, a poly(propoxylated bisphenol A co-fumarate) resin of formula I as described above may be combined with a crystalline resin of formula II to form a latex emulsion.

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the amorphous resin may be a polyester resin having an acid number from about 2 mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

In embodiments, a crystalline polyester resin may possess acidic groups having an acid number of about 1 mg KOH/g polymer to about 200 mg KOH/g polymer, in embodiments from about 5 mg KOH/g polymer to about 50 mg KOH/g polymer.

Solvent

Any suitable organic solvent may be used to dissolve the resin, for example, alcohols, esters, ethers, ketones, amines, and combinations thereof, in an amount of, for example, from about 1 weight percent to about 100 weight percent of the resin, in embodiments from about 10 weight percent to about 90 weight percent of the resin, in other embodiments from about 25 weight percent to about 85 weight percent of the resin.

In embodiments, suitable organic solvents, sometimes referred to, in embodiments, as phase inversion agents, include, for example methanol, ethanol, propanol, isopropanol, 1-butanol, 2-butanol, tert-butanol, pentanol, ethylene glycol, propylene glycol, ethyl acetate, methyl ethyl ketone, and combinations thereof. In embodiments, the organic solvent may be isopropanol, methyl ethyl ketone, and combinations thereof, in an amount of, for example, from about 1 weight percent to about 25 weight percent of the resin, in embodiments from about 2 weight percent to about 20 weight percent of the resin, in other embodiments from about 3 weight percent to about 15 weight percent of the resin.

In embodiments, the organic solvent may be immiscible in water and may have a boiling point from about 30° C. to about 150° C.

In embodiments, an emulsion formed in accordance with the present disclosure may also include water, in embodiments, de-ionized water (DIW), in amounts from about 30% to about 95%, in embodiments, from about 30% to about 60%, at temperatures that melt or soften the resin, from about 20° C. to about 120° C., in embodiments from about 30° C. to about 100° C.

Stabilizing Agent

In embodiments, it may be advantageous to include a stabilizing agent, also referred to as a stabilizer, when forming the latex particles. Suitable stabilizers include those which are useful in stabilizing polymers or polymer systems containing ester groups, ester functionality, or which release acids upon aging. The stabilizers may protect the ester groups of the polyester resins from hydrolysis and/or neutralize free acids. The polymers or polymer systems may include the polyester resins described above, optionally dissolved in an organic solvent. Suitable stabilizer systems of the present disclosure may include a functional group of the formula RN=C=NR, i.e., a carbodiimide. In embodiments, a stabilizer system may include one or more carbodiimides. The carbodiimides may be aliphatic, cycloaliphatic, aromatic, monocarbodiimides, and combinations thereof. Suitable aliphatic carbodiimides may include diisopropylcarbodiimide, methyl-tert-butyl-carbodiimide, and combinations thereof. Suitable cycloaliphatic carbodiimides may include dicyclohexyl-carbodiimide. Suitable aromatic carbodiimides may include diphenyl-carbodiimide, di-p-tolyl-carbodiimide, and combinations thereof. In embodiments, suitable carbodiimides may include aromatic or cycloaliphatic carbodiimides such as, for example aromatic or cycloaliphatic monocarbodiimides which are substituted in the 2 and 2' position with an alkyl group having from about 1 to about 18 carbon atoms such as, for example methyl, ethyl, propyl, isopropyl, butyl, isobutyl, dodecyl, octadecyl, allyl, crotyl, oleyl, combinations thereof, and the like; aralkyl groups such as, for example benzyl, beta-phenyl ethyl, xylyl, combinations thereof, and the like; aryl groups such as, for example phenyl, tolyl, naphthyl, combinations thereof, and the like; alkoxy groups with alkyl residues having from about 1 to about 18 carbon atoms such as, for example methoxy, ethoxy, butoxy, combinations thereof, and the like; halogen atoms such as, for example chlorine, bromine, fluorine, iodine, combinations thereof, and the like; nitro groups; carbalkoxy groups such as, for example carbomethoxy, carbethoxy, combinations thereof, and the like; cyano groups, combinations thereof, and the like. Carbodiimides which contain substituents other than the aforementioned types on the aromatic or cycloaliphatic rings may be used such as, for example tetra-substituted on the aromatic or cycloaliphatic ring in the 2,2' and 6,6' positions. Others may include 2,2' and 6,6'-substituted aromatic or cycloaliphatic carbodiimides wherein the substituent is alkyl or alkoxy. Examples of substituted aromatic and cycloaliphatic carbodiimides are: 2,2'-dimethyl-diphenyl carbodiimide, 2,2'-diisopropyl-diphenyl carbodiimide, 2-dodecyl-2'-n-propyl-diphenyl carbodiimide, 2,2'-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyldiphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6, 2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetra-ethyl-dicyclohexyl carbodiimide and 2,2'-dichlorodicyclohexyl carbodiimide, 2,2'-dicarbethoxy-diphenyl carbodiimide, 2,2'-dicyano-diphenyl carbodiimide, combinations thereof and the like. The carbodiimides may be either miscible or dispersible in water. Suitable carbodiimides include those that are sterically hindered, water miscible, and contain little or no organic solvent. Commercially available carbodiimides which may be used include STABAXOL® P 200 (reaction product of tetramethylxylene diisocyanate; water-dispersed) (commercially available from Rhein Chemie), STABAXOL® P (poly (nitrilomethanetetraylnitrilo (2,4,6-tris(1-methylethyl)-1,3-phenylene)) (commercially available from Rhein Chemie), STABAXOL® I (tetraisopropyldiphenylcarbodiimide) (commercially available from Rhein Chemie) and UCAR-INK® XL-29SE (commercially available from Union Carbide). Other suitable carbodiimides include N,N'-dicyclohexylcarbodiimide, N,N'-diisopropylcarbodiimide, 1-ethyl-3-(3-dimethylaminopropyl) carbodiimide, tetramethylxylylene carbodiimide, and combinations thereof.

Where carbodiimides are utilized as stabilizers for polyesters dispersed in aqueous-based solvents, they will react with water. Upon reaction with water, the carbodiimide 2,2',6,6'-tetraisopropyldiphenyl carbodiimide will produce 2,2',6,6'-tetraisopropyldiphenyl urea (as depicted in Formula I below).

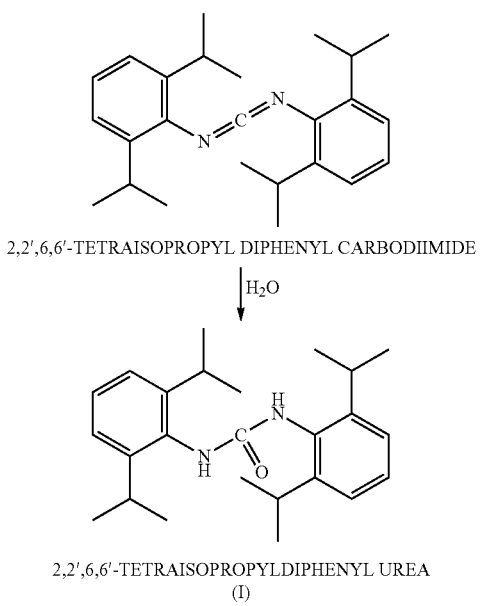

2,2',6,6'-TETRAISOPROPYL DIPHENYL CARBODIIMIDE

↓ H₂O 2,2',6,6'-TETRAISOPROPYLDIPHENYL UREA
(I)

The nitrogen-containing urea byproduct depicted in Formula I above may serve to further enhance the stability of the polyester emulsion.

In embodiments, a suitable carbodiimide, such as aromatic or cycloaliphatic carbodiimides substituted in the 2 and 2' position, including 2,2',6,6'-tetraisopropyldiphenyl carbodiimide, may be utilized.

As indicated above, in embodiments, the stabilizing agent may be dissolved in an organic solvent with at least one polyester resin and water. In embodiments, the stabilizing agent may be added neat into the melt form of the polymer and cooled and grinded for PIE.

The stabilizer may be added in amounts from about 0.01 to about 20 weight percent based on polymer solids, in embodiments from about 0.1 to about 10 weight percent based on polymer solids, in embodiments from about 1 to about 7 weight percent based on polymer solids.

Neutralizing Agent

In embodiments, the resin may be mixed with a weak base or neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof, and the like. Suitable basic agents may also include monocyclic compounds and polycyclic compounds having at least one nitrogen atom, such as, for example, secondary amines, which include aziridines, azetidines, piperazines, piperidines, pyridines, bipyridines, terpyridines, dihydropyridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthyridines, triazines, triazoles, tetrazoles, pyrazoles, pyrazolines, and combinations thereof. In embodiments, the monocyclic and polycyclic compounds may be unsubstituted or substituted at any carbon position on the ring.

The basic agent may be utilized in an amount from about 0.001 weight percent to 50 weight percent of the resin, in embodiments from about 0.01 weight percent to about 25 weight percent of the resin, in embodiments from about 0.1 weight percent to 5 weight percent of the resin. In embodiments, the neutralizing agent may be added in the form of an aqueous solution. In other embodiments, the neutralizing agent may be added in the form of a solid.

Utilizing the above basic neutralization agent in combination with a resin possessing acid groups, a neutralization ratio from about 25% to about 500% may be achieved, in embodiments from about 50% to about 300%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, in embodiments, from about 6 to about 11. The neutralization of the acid groups may, in embodiments, enhance formation of the emulsion.

Surfactants

In embodiments, the process of the present disclosure may optionally include adding a surfactant, before or during the melt mixing, to the resin at an elevated temperature. In embodiments, the surfactant may be added prior to melt-mixing the resin at an elevated temperature.

Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as a solid or as a solution with a concentration from about 5% to about 100% (pure surfactant) by weight, in embodiments, from about 10% to about 95 weight percent. In embodiments, the surfactant may be utilized so that it is present in an amount from about 0.01 weight percent to about 20 weight percent of the resin, in embodiments, from about 0.1 weight percent to about 16 weight percent of the resin, in other embodiments, from about 1 weight percent to about 14 weight percent of the resin.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™™ 2A1, an alkyldiphenyloxide disulfonate from The Dow Chemical Company, and/or TAYCA POWER BN2060 from Tayca Corporation (Japan), which are branched sodium dodecylbenzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Examples of nonionic surfactants that may be utilized for the processes illustrated herein include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants may include a block copolymer of polyethylene oxide and polypropylene oxide, including those commercially available as SYNPERONIC PE/F, in embodiments SYNPERONIC PE/F 108. Combinations of these surfactants and any of the foregoing surfactants may be utilized in embodiments.

Processing

As noted above, the present process includes melt mixing a mixture at an elevated temperature containing at least one polyester resin, an organic solvent, a stabilizing agent, optionally a surfactant, and a neutralizing agent to form a latex emulsion. In embodiments, the resins may be pre-blended prior to melt mixing. In embodiments, the stabilizing agent may be added to the pre-blended resin. In other embodiments, the carbodiimide stabilizing agent may be added after the resin mixture is melt mixed.

More than one resin may be utilized in forming the latex. As noted above, the resin may be a crystalline resin. In embodiments, the resin may be a crystalline resin and the elevated temperature may be a temperature above the crystallization temperature of the crystalline resin. In further embodiments, the resin may be an amorphous resin or a mixture of amorphous and crystalline resins and the temperature may be above the glass transition temperature of the mixture.

Thus, in embodiments, a process of the present disclosure may include contacting at least one resin with an organic solvent and a stabilizing agent to form a resin mixture, heating the resin mixture to an elevated temperature, stirring the mixture, adding a neutralizing agent to neutralize the acid groups of the resin, adding water dropwise into the mixture until phase inversion occurs to form a phase inversed latex emulsion, distilling the latex to remove from it a water solvent mixture in the distillate and producing a high quality latex, separating the solvent from the water in the distillate, and optionally adding salt to the water phase to extract further water from the organic phase.

In other embodiments, a process of the present disclosure may include contacting at least one resin with an organic solvent to form a resin mixture, heating the resin mixture to an elevated temperature, stirring the mixture, adding a stabilizing agent to the resin mixture and adding a neutralizing agent to neutralize the acid groups of the resin, adding water dropwise into the mixture until phase inversion occurs to form a phase inversed latex emulsion, distilling the latex to remove from it a water solvent mixture in the distillate and producing a high quality latex, separating the solvent from the water in the distillate, and optionally adding salt to the water phase to extract further water from the organic phase.

In the phase inversion process, the polyester resins may be dissolved in a low boiling organic solvent, which solvent is miscible in water, such as isopropanol, ethyl acetate, methyl ethyl ketone, and combinations thereof, or any other solvent noted above, at a concentration from about 1 weight percent to about 85 weight percent resin in solvent, in embodiments from about 5 weight percent to about 60 weight percent resin in solvent.

The resin mixture is then heated to a temperature from about 25° C. to about 90° C., in embodiments from about 30° C. to about 85° C. The heating need not be held at a constant temperature, but may be varied. For example, the heating may be slowly or incrementally increased until a desired temperature is achieved.

In accordance with the present disclosure, a crystalline anti/or an amorphous polyester latex may be obtained using a two solvent PIE process which requires dispersing and solvent stripping steps. In this process, the polyester resin may be dissolved in a combination of two organic solvents, for example, MEK and IPA, to produce a homogenous organic phase. In embodiments, the stabilizing agent is added to the solvents with the polyester resin. In other embodiments, the carbodiimide stabilizing agent may be added to the dissolved resin mixture. A fixed amount of base solution (such as ammonium hydroxide) is then added into this organic phase to neutralize acid end groups on the polyester chain, followed by the addition of de-ionized water (DIW) to form a uniform dispersion of polyester particles in water through phase inversion. The organic solvents and the stabilizing agent remain in both the polyester particles and water phase at this stage. Through vacuum distillation, the solvents are stripped off.

In embodiments, the neutralizing agent or base solution which may be utilized in the process of the present disclosure includes the agents mentioned hereinabove. In embodiments, the optional surfactant utilized may be any of the surfactants mentioned hereinabove to ensure that proper resin neutralization occurs and leads to a high quality latex with low coarse content.

In embodiments, the stabilizing agent may be added to the one or more ingredients of the resin composition before, during, or after, melt-mixing.

In embodiments, the surfactant may be added to the one or more ingredients of the resin composition before, during, or after melt-mixing. In embodiments, the surfactant may be added before, during, or after the addition of the neutralizing agent. In embodiments, the surfactant may be added prior to the addition of the neutralizing agent. In embodiments, a surfactant may be added to the pre-blend mixture prior to melt mixing.

The melt-mixing temperature may be from about 25° C. to about 200° C., in embodiments from about 50° C. to about 100° C., in other embodiments from about 55° C. to about 90° C.

Once the resins, stabilizing agent, neutralizing agent and optional surfactant are melt mixed, the mixture may then be contacted with water, to form a latex emulsion. Water may be added in order to form a latex with a solids content from about 5% to about 50%, in embodiments, from about 10% to about 45%. While higher water temperatures may accelerate the dissolution process, latexes can be formed at temperatures as low as room temperature. In other embodiments, water temperatures may be from about 40° C. to about 110° C., in embodiments, from about 50° C. to about 100° C.

In embodiments, a continuous phase inversed emulsion may be formed. Phase inversion can be accomplished by continuing to add an aqueous alkaline solution or basic agent, optional surfactant and/or water compositions to create a phase inversed emulsion which includes a disperse phase including droplets possessing the molten ingredients of the resin composition and the stabilizing agent, and a continuous phase including the surfactant and/or water composition.

Melt mixing may be conducted, in embodiments, utilizing any means within the purview of those skilled in the art. For example, melt mixing may be conducted in a glass kettle with an anchor blade impeller, an extruder, i.e. a twin screw extruder, a kneader such as a Haake mixer, a batch reactor, or any other device capable of intimately mixing viscous materials to create near homogenous mixtures.

Stirring, although not necessary, may be utilized to enhance formation of the latex. Any suitable stirring device may be utilized. In embodiments, the stirring may be at a speed from about 10 revolutions per minute (rpm) to about 5,000 rpm, in embodiments from about 20 rpm to about 2,000 rpm, in other embodiments from about 50 rpm to about 1,000 rpm. The stirring need not be at a constant speed, but may be varied. For example, as the heating of the mixture becomes more uniform, the stirring rate may be increased. In embodiments, a homogenizer (that is, a high shear device), may be utilized to form the phase inversed emulsion, but in other embodiments, the process of the present disclosure may take place without the use of a homogenizer. Where utilized, a homogenizer may operate at a rate from about 3,000 rpm to about 10,000 rpm.

Although the point of phase inversion may vary depending on the components of the emulsion, the temperature of heating, the stirring speed, and the like, phase inversion may occur when the basic neutralization agent, optional surfactant, and/or water has been added so that the resulting resin is present in an amount from about 5 weight percent to about 70 weight percent of the emulsion, in embodiments from about 20 weight percent to about 65 weight percent of the emulsion, in other embodiments from about 30 weight percent to about 60 weight percent of the emulsion.

Following phase inversion, additional surfactant, water, and/or aqueous alkaline solution may optionally be added to dilute the phase inversed emulsion, although this is not required. Additional stabilizer may optionally be added following phase inversion. Following phase inversion, the phase inversed emulsion may be cooled to room temperature, for example from about 20° C. to about 25° C.

In embodiments, distillation with stirring of the organic solvent may be performed to provide resin emulsion particles with an average diameter size of, for example, from about 30 nm to about 500 nm, in embodiments from about 120 nm to about 250 nm.

The latex emulsions of the present disclosure may then be utilized to produce particles that are suitable for emulsion aggregation ultra low melt processes.

The emulsified resin particles in the aqueous medium may have a submicron size, for example of about 1 μm or less, in embodiments about 500 nm or less, such as from about 10 nm to about 500 nm, in embodiments from about 50 nm to about 400 nm, in other embodiments from about 100 nm to about 300 nm, in some embodiments about 200 nm. Adjustments in particle size can be made by modifying the ratio of water to resin, the neutralization ratio, solvent concentration, and solvent composition.

Particle size distribution of a latex of the present disclosure may be from about 30 nm to about 500 nm, in embodiments, from about 125 nm to about 400 nm.

The coarse content of the latex of the present disclosure may be from about 0.01 weight percent to about 5 weight percent, in embodiments, from about 0.1 weight percent to about 3 weight percent. The solids content of the latex of the present disclosure may be from about 10 weight percent to about 50 weight percent, in embodiments, from about 20 weight percent to about 40 weight percent.

The process of the present disclosure for the production of polyester latex emulsions utilizing stabilizing agents such as carbodiimides stabilizes the polymer from hydrolysis in its aqueous environment. Carbodiimides act as dehydrating agents to stabilize the hydrolysable polymer as they chemically react with moisture, which thus increases the shelf life of an emulsified resin product before preparing the toner.

Hydrolytic stability of the resin emulsions of the present disclosure may be measured based on the percentage change in pH and/or molecular weight of the resin emulsion when stored over a period of time.

In embodiments, the percentage change in pH of the carbodiimide containing resin emulsions of the present disclosure may be from about 0 to about 10 percent, in embodiments from about 0.01 to about 5 percent, in embodiments from about 0.1 to about 2 percent, when stored from a period of time from about 0 to about 38 days, in embodiments from about 1 to about 28 days, in embodiments from about 2 to about 14 days.

In embodiments, the pH of the carbodiimide containing resin emulsions of the present disclosure may be from about 7.1 to about 7.8, in embodiments from about 7.3 to about 7.7, in embodiments from about 7.5 to about 7.6, when stored from a period of time from about 0 to about 38 days, in embodiments from about 1 to about 28 days, in embodiments from about 2 to about 14 days, compared to latex particles having no stabilizing agent which exhibit a percentage change in pH greater than 10 percent when stored for a period of time of from about 0 days to about 38 days.

In embodiments, the percentage change of molecular weight of the resin emulsion particles of the present disclosure may be from about 0 to about 30 percent, in embodiments from about 0.01 to about 20 percent, in embodiments from about 0.1 to about 10 percent, when stored from a period of time from about 0 to about 70 days, in embodiments from about 1 to about 21 days, in embodiments from about 2 to about 10 days, compared to latex particles having no stabilizing agent which exhibit a percentage change in molecular weight greater than 30 percent when stored for a period of time of from about 0 days to about 70 days.

In embodiments, the molecular weight of the resin emulsion particles of the present disclosure may be from about 18,000 to about 26,000, in embodiments from about 21500 to about 25,000, in embodiments from about 23,000 to about 24,000, when stored from a period of time from about 0 to about 70 days, in embodiments from about 1 to about 21 days, in embodiments from about 2 to about 10 days.

Toner

Once the resin mixture has been contacted with water to form an emulsion and the solvent removed from this mixture as described above, the resulting latex may then be utilized to form a toner by any method within the purview of those skilled in the art. The latex emulsion may be contacted with a colorant, optionally in a dispersion, and other additives to form an ultra low melt toner by a suitable process, in embodiments, an emulsion aggregation and coalescence process.

In embodiments, the optional additional ingredients of a toner composition including colorants, waxes, and other additives, may be added before, during or after melt mixing the resin to form the latex emulsion of the present disclosure. The additional ingredients may be added before, during or after formation of the latex emulsion. In further embodiments, the colorant may be added before the addition of the surfactant.

Colorants

As the colorant to be added, various known suitable colorants, such as dyes, pigments, mixtures of dyes, mixtures of pigments, mixtures of dyes and pigments, and the like, may be included in the toner. The colorant may be added in amounts from about 0.1 to about 35 weight percent of the toner, in embodiments from about 1 to about 15 weight percent of the toner, in embodiments from about 3 to about 10 weight percent of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Wax

Optionally, a wax may also be combined with the resin and a colorant in forming toner particles. The wax may be provided in a wax dispersion, which may include a single type of wax or a mixture of two or more different waxes. A single wax may be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

When included, the wax may be present in an amount of, for example, from about 1 weight percent to about 25 weight percent of the toner particles, in embodiments from about 5 weight percent to about 20 weight percent of the toner particles.

When a wax dispersion is used, the wax dispersion may include any of the various waxes conventionally used in emulsion aggregation toner compositions. Waxes that may be selected include waxes having, for example, an average molecular weight from about 500 to about 20,000, in embodiments from about 1,000 to about 10,000. Waxes that may be used include, for example, polyolefins such as polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, and polybutene waxes such as commercially available from Allied Chemical and Petrolite Corporation, for example POLYWAX™ polyethylene waxes such as commercially available from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax such as waxes derived from distillation of crude oil, silicone waxes, mercapto waxes, polyester waxes, urethane waxes; modified polyolefin waxes (such as a carboxylic acid-terminated polyethylene wax or a carboxylic acid-terminated polypropylene wax); Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethylene glycol monostearate, dipropylene glycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, such as aliphatic polar amide functionalized waxes; aliphatic waxes consisting of esters of hydroxylated unsaturated fatty acids, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents. In embodiments, the waxes may be crystalline or non-crystalline.

In embodiments, the wax may be incorporated into the toner in the form of one or more aqueous emulsions or dispersions of solid wax in water, where the solid wax particle size may be from about 100 to about 300 nm.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner particle shape and morphology.

In embodiments, toner compositions may be prepared by emulsion aggregation processes, such as a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent such as polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

Suitable examples of organic cationic aggregating agents include, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, combinations thereof, and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc, dialkyl zinc, zinc oxides, stannous oxide, dibutyltin oxide, dibutyltin oxide hydroxide, tetraalkyl tin, combinations thereof, and the like. Where the aggregating agent is a polyion aggregating agent, the agent may have any desired number of polyion atoms present. For example, in embodiments, suitable polyaluminum compounds have from about 2 to about 13, in other embodiments, from about 3 to about 8, aluminum ions present in the compound.

The aggregating agent may be added to the mixture utilized to form a toner in an amount of, for example, from about 0 to about 10 weight percent, in embodiments from about 0.2 to about 8 weight percent, in other embodiments from about 0.5 to about 5 weight percent, of the resin in the mixture. This should provide a sufficient amount of agent for aggregation.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example from about 40° C. to about 90° C., in embodiments from about 45° C. to about 80° C., which may be below the glass transition temperature of the resin as discussed above.

Once the desired final size of the toner particles is achieved, the pH of the mixture may be adjusted with a base to a value from about 3 to about 10, and in embodiments from about 5 to about 9. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above.

In embodiments, the final size of the toner particles may be from about 2 μm to about 12 μm, in embodiments from about 3 μm to about 10 μm.

Shell Resin

In embodiments, after aggregation, but prior to coalescence, a resin coating may be applied to the aggregated particles to form a shell thereover. In embodiments, the core may thus include a crystalline resin, as described above. Any resin described above may be utilized as the shell. In embodiments, a polyester amorphous resin latex as described above may be included in the shell. In embodiments, the polyester amorphous resin latex described above may be combined with a different resin, and then added to the particles as a resin coating to form a shell.

In embodiments, resins which may be utilized to form a shell include, but are not limited to, a crystalline resin latex described above, and/or the amorphous resins described above. In embodiments, an amorphous resin which may be utilized to form a shell in accordance with the present disclosure includes an amorphous polyester, optionally in combination with a crystalline polyester resin latex described above. Multiple resins may be utilized in any suitable amounts. In embodiments, a first amorphous polyester resin, for example an amorphous resin of formula I above, may be present in an amount from about 20 percent by weight to about 100 percent by weight of the total shell resin, in embodiments from about 30 percent by weight to about 90 percent by weight of the total shell resin. Thus, in embodiments, a second resin may be present in the shell resin in an amount from about 0 percent by weight to about 80 percent by weight of the total shell resin, in embodiments from about 10 percent by weight to about 70 percent by weight of the shell resin.

The shell resin may be applied to the aggregated particles by any method within the purview of those skilled in the art. In embodiments, the resins utilized to form the shell may be in an emulsion including any surfactant described above. The emulsion possessing the resins, optionally the solvent based crystalline polyester resin latex neutralized with NaOH described above, may be combined with the aggregated particles described above so that the shell forms over the aggregated particles.

The formation of the shell over the aggregated particles may occur while heating to a temperature from about 30° C. to about 80° C., in embodiments from about 35° C. to about 70° C. The formation of the shell may take place for a period of time from about 5 minutes to about 10 hours, in embodiments from about 10 minutes to about 5 hours.

The shell may be present in an amount from about 1 percent by weight to about 80 percent by weight of the toner components, in embodiments from about 10 percent by weight to about 40 percent by weight of the toner components, in still further embodiments from about 20 percent by weight to about 35 percent by weight of the toner components.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 1000 rpm to about 100 rpm, in embodiments from about 800 rpm to about 200 rpm. Coalescence may be accomplished over a period from about 0.01 to about 9 hours, in embodiments from about 0.1 to about 4 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may optionally also be used as an external additive for providing lubricating properties, developer conductivity, tribo enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0.1 weight percent to about 5 weight percent of the toner, in embodiments from about 0.25 weight percent to about 3 weight percent of the toner, although the amount of additives can be outside of these ranges. In embodiments, the toners may include, for example, from about 0.1 weight percent to about 5 weight percent titania, from about 0.1 weight percent to about 8 weight percent silica, and from about 0.1 weight percent to about 4 weight percent zinc stearate.

Suitable additives include those disclosed in U.S. Pat. Nos. 3,590,000, and 6,214,507, the disclosures of each of which are hereby incorporated by reference in their entirety.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature from about 20° C. to about 25° C.

EXAMPLES

Comparative Example 1

Solvent-based emulsification of a crystalline polyester resin. A 1 liter glass kettle was charged with about 58 grams of isopropanol (IPA), about 70 grams of methyl ethyl ketone (MEK) and about 200 grams of an unsaturated crystalline polyester resin (UCPE) with an acid value (AV) of about 10.5 mg KOH/g polymer. The glass kettle was placed inside a water bath set at about 76° C. with its cover on, a gasket, a condenser, and an anchor blade impeller for stirring. About 600 grams of de-ionized water (DIW) was heated through a coiled tube to a temperature of about 96° C.

The resin was heated to about 76° C. with stirring at about 60 rpm. The mixture was left to stir for about 100 minutes to substantially dissolve the resin into the solvent mixture. Once the resin was melted/dissolved, the bath temperature was decreased to about 70° C. and about 6.04 grams of 10% $NH_4OH$ solution (calculated as 10% $NH_3$) (neutralization ratio of about 95%) was added to the reaction vessel and the stirring was increased to about 100 rpm.

The mixture was left to stir for about 10 minutes. Thereafter, about 400 grams of the pre-heated DIW was pumped into the kettle at a flow rate of about 4.4 grams/minute over about 90 minutes.

Then, another 200 grams of hot DIW was added at a rate of about 10 g/min over about 20 minutes. The mixture was then cooled to room temperature and screened through a 20 micron sieve. The resulting resin emulsion included about 30% solids by weight and had a volume average diameter of about 113 nanometers as measured with the NANOTRAC® particle size analyzer.

The emulsion/solvent solution was poured into a glass pan and kept in a fume hood and stirred for about 24 hours by a magnetic stir-bar to evaporate the methyl ethyl ketone and isopropanol from the resin emulsion.

Example 1

Solvent-based emulsification of a crystalline polyester resin as in Comparative Example 1 with a stabilizing agent. About 200 grams of an UCPE with an AV of about 10.5 mg KOH/g polymer, about 58 grams of IPA, about 70 grams of MEK, and about 3 grams of tetraisopropyldiphenylcarbodiimide (about 1.5 weight percent) (commercially available from RheinChemie as STABAXOL® I), were charged into a 1 liter glass reaction vessel. The glass kettle was placed inside a water bath set at about 76° C. with its cover on, a gasket, a condenser, and an anchor blade impeller for stirring. About 600 grams of de-ionized water (DIW) was heated through a coiled tube to a temperature of about 96° C.

The resin was heated to about 76° C. with stirring at about 60 rpm. The mixture was left to stir for about 120 minutes to substantially dissolve the resin into the solvent mixture. Once the resin was melted/dissolved, the bath temperature was decreased to about 70° C. and about 6.04 grams of 10% $NH_4OH$ solution (calculated as 10% $NH_3$) (neutralization ratio of about 95%) was added to the reaction vessel and the stirring was increased to about 100 rpm.

The mixture was left to stir for about 10 minutes. Thereafter, about 400 grams of the pre-heated DIW was pumped into the kettle at a flow rate of about 4.4 grams/minute over about 90 minutes.

Then, another 200 grams of hot DIW was added at a rate of about 13.7 g/min over about 15 minutes. The mixture was then cooled to room temperature and screened through a 20 micron sieve. The resulting resin emulsion included about 30% solids by weight and had a volume average diameter of about 148.5 nanometers as measured with the NANOTRAC® particle size analyzer.

Example 2

Solvent-based emulsification of a crystalline polyester resin as in Example 1 with another stabilizing agent.

A resin emulsion was formed as in Example 1 with about 3.15 grams of a N,N'-(2,2',6,6'-tetraisopropyldiphenyl)carbodiimide (about 1.5 weight percent) (commercially available from Rhein Chemie as STABAXOL® I LF) as the stabilizing agent.

The resulting resin emulsion included about 30% solids by weight and had a volume average diameter of about 137 nanometers as measured with the NANOTRAC® particle size analyzer.

Example 3

Solvent-based emulsification of a crystalline polyester resin as in Example 1 with another stabilizing agent.

A resin emulsion was formed as in Example 1 with about 4 grams of a tetramethylxylene diisocyanate carbodiimide (about 2 weight percent) (commercially available from Rhein Chemie as STABAXOL® P200) as the stabilizing agent.

The resulting resin emulsion included about 30% solids by weight and had a volume average diameter of about 214.9 nanometers as measured with the NANOTRAC® particle size analyzer.

Example 4

Solvent-based emulsification of a crystalline polyester resin as in Example 1 with another stabilizing agent.

A resin emulsion was formed as in Example 1 with about 10 grams of a tetraisopropyldiphenylcarbodiimide (about 5 weight percent) (commercially available from Rhein Chemie as STABAXOL® I) as the stabilizing agent.

The resulting resin emulsion included about 30% solids by weight and had a volume average diameter of about 1.081 micrometers as measured with the NANOTRAC® particle size analyzer.

Both the control (Comparative Example 1) and carbodiimide-containing emulsions (Examples 1-4) were aged at about 22° C. (about 72° F.) for about 38 days and at about 38° C. (about 100° F.) for about 155 days. The pH was measured for the emulsions aged at 22° C., while the molecular weight was measured for the accelerated aging (heated to 38° C.) emulsions. Table 1 below shows changes in pH of polyester emulsion containing various carbodiimides.

TABLE 1

|  | pH-Day 0 | pH-Day 7 | pH-Day 14 | pH-Day 21 | pH-Day 28 | pH-Day 38 |
| --- | --- | --- | --- | --- | --- | --- |
| Comparative Example 1 | 7.40 | 7.25 | 7.17 | 6.94 | 6.94 | 6.62 |
| Example 1 | 7.53 | 7.37 | 7.27 | 7.07 | 7.07 | 6.78 |
| Example 2 | 7.63 | 7.53 | 7.41 | 7.19 | 7.19 | 6.97 |
| Example 3 | 7.66 | 7.61 | 7.57 | 7.37 | 7.37 | 7.15 |

FIG. 1 depicts hydrolytic stability of unsaturated crystalline polyester aqueous emulsions of the present disclosure based on the percentage change in pH over a period of time of about 38 days. As illustrated in FIG. 1 and Table 1 shown above, the emulsion of Comparative Example 1 resulted in the greatest change in pH over 38 days at room temperature. The pH of the control decreased from about 7.40 to about 6.62, indicating degradation of the polyester via hydrolysis. The ester units in the polymer chain were hydrolytically cleaved, which resulted in the generation of free carboxylic acid groups thus causing a decrease in pH. Example 3 (containing 2.0% STABAXOL® P200) resulted in marked stability.

Figure 2:
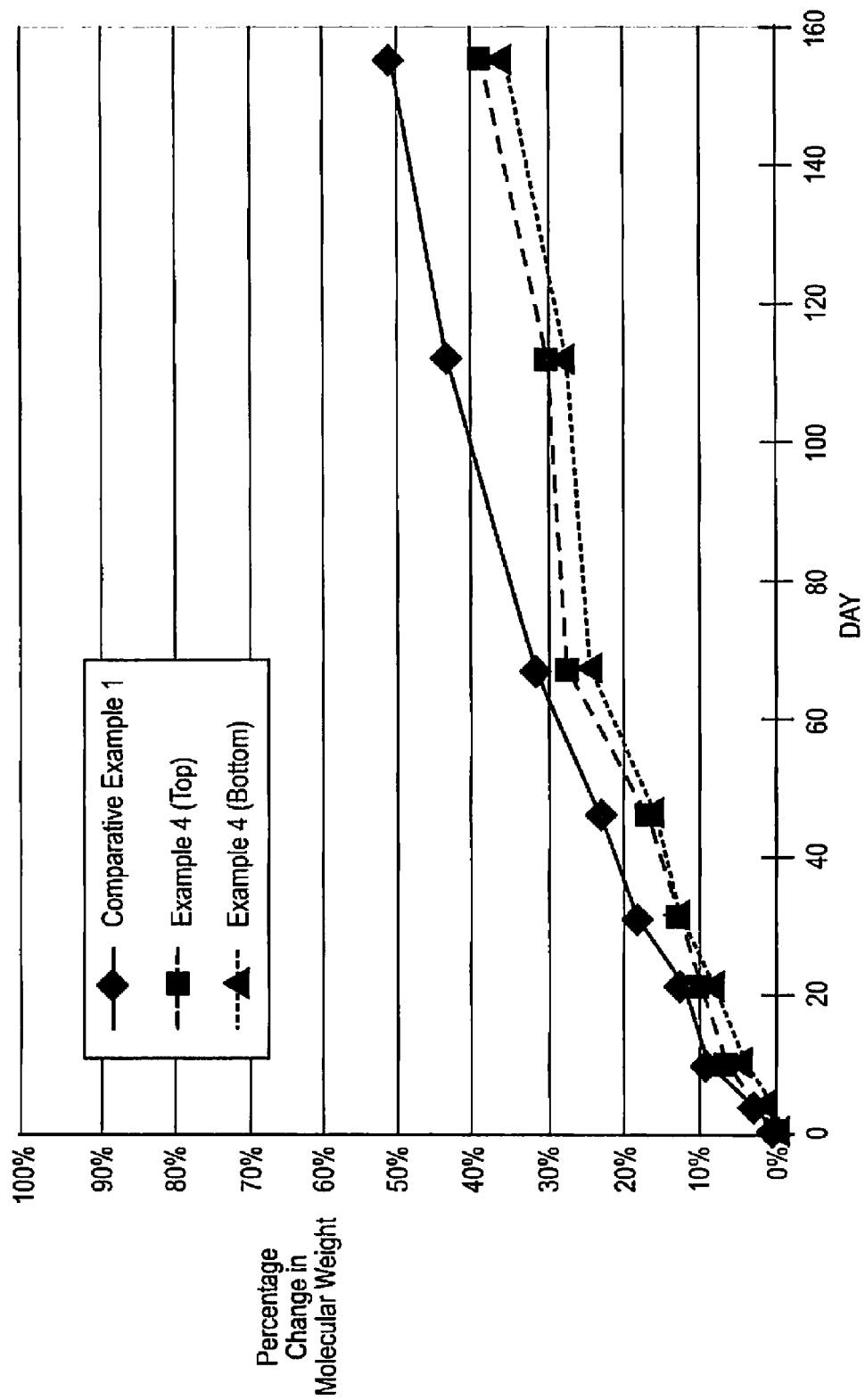
FIG. 2 is a graph depicting percentage change of molecular weight of unsaturated crystalline polyester emulsions containing a carbodiimide in accordance with the present disclosure compared with a comparative emulsion.

FIG. 2 illustrates the significant degradation of the emulsion of Comparative Example 1 stored under heated conditions when compared to the carbodiimide-containing emulsions also aged under heated conditions. The carbodiimide-containing emulsions were sampled from both the top and bottom sections to ensure no significant settling took place. Settling was evident in Comparative Example 1 which was due to the destabilization of particles and was indicative of emulsion degradation. This phenomenon was confirmed by measuring the molecular weight; where the decrease in molecular weight was consistent with hydrolytic cleavage of the polymer ester units.

Figure 3:
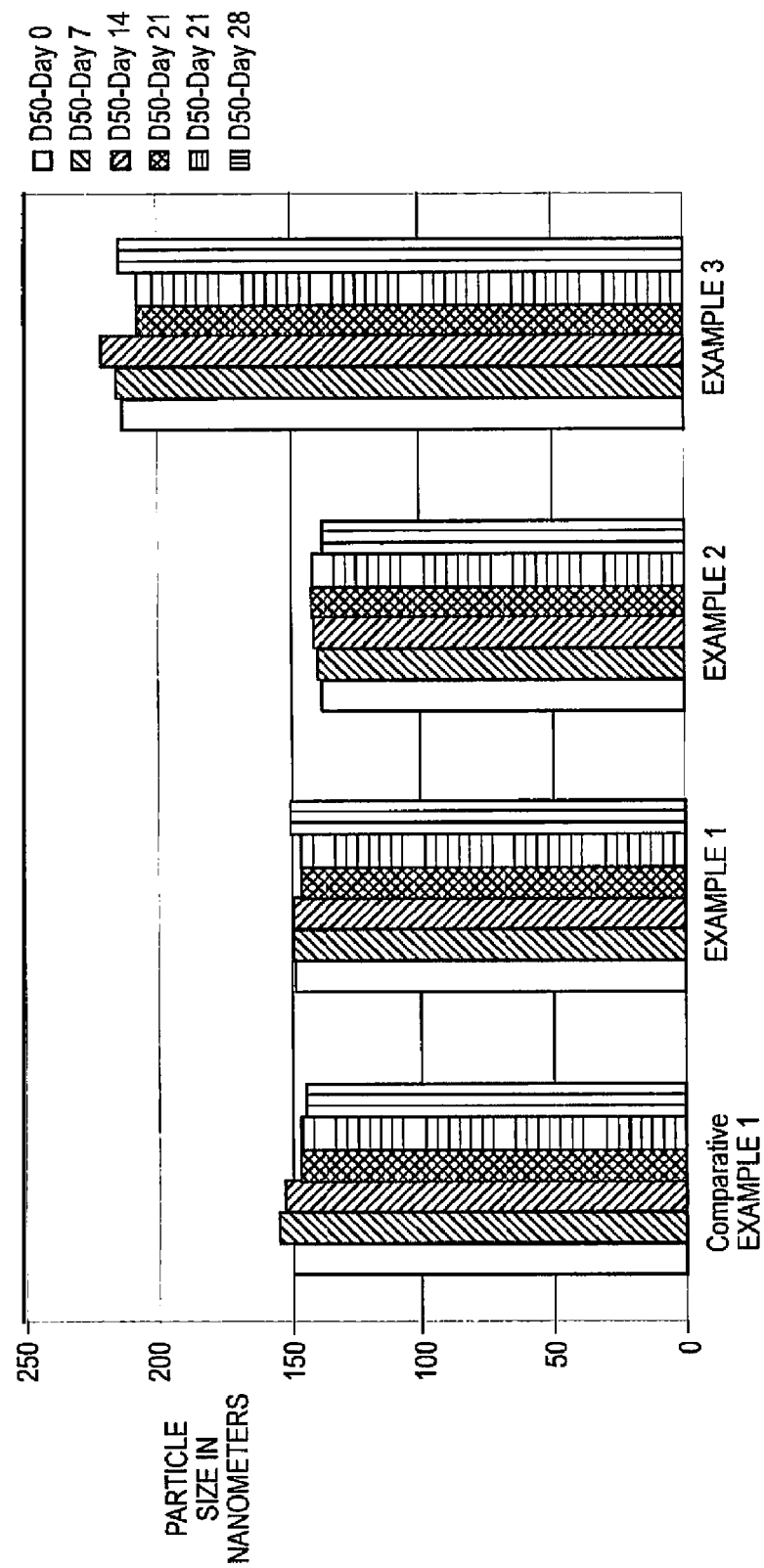
FIG. 3 is a graph depicting particle size of unsaturated crystalline polyester emulsions containing a carbodiimide in accordance with the present disclosure as compared with a comparative emulsion.

FIG. 3 shows that the particle size of the emulsion of Comparative Example 1 and the carbodiimide-containing emulsions did not change significantly over the course of the room temperature aging study. Nevertheless, the pH data showed a change in the aqueous environment, indicating an increase in free carboxylic acid groups from hydrolysis of the UCPE polyester chains when not emulsified with the carbodiimide.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
    contacting at least one polyester resin with at least one organic solvent and a stabilizing agent comprising a carbodiimide to form a resin mixture;
    mixing the resin mixture;
    contacting the mixture with a neutralizing agent to form a neutralized mixture;
    contacting the neutralized mixture with de-ionized water to form an emulsion; and
    recovering latex particles from the emulsion contacting the latex particles with an optional colorant, an optional wax, an optional additive, and an amorphous polyester resin to form toner particles.

2. A process according to claim 1, wherein the at least one organic solvent is selected from the group consisting of esters, ethers, ketones, alcohols, amines, and combinations thereof in an amount of from about 1 weight percent to about 100 weight percent of the polyester resin.

3. A process according to claim 1, wherein the carbodiimide is selected from the group consisting of poly(nitrilomethanetetraylnitrilo (2,4,6-tris(1-methylethyl)-1,3-phenylene), tetraisopropyldiphenylcarbodiimide, 2,2',6,6'-tetraisopropyldiphenyl carbodiimide, N,N'-dicyclohexylcarbodiimide, N,N'-diisopropylcarbodiimide, 1-ethyl-3-(3-dimethylaminopropyl)carbodiimide, tetramethylxylylene carbodiimide, diisopropylcarbodiimide, methyl-tert-butyl-carbodiimide, dicyclohexyl-carbodiimide, diphenyl-carbodiimide, di-p-tolyl-carbodiimide, 2,2'-dimethyl-diphenyl carbodiimide, 2,2'-diisopropyl-diphenyl carbodiimide, 2-dodecyl-2'-n-propyl-diphenyl carbodiimide, 2,2'-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyl-diphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetraethyl-dicyclohexyl carbodiimide, 2,2'-dichlorodicyclohexyl carbodiimide, 2,2'-dicarbethoxy-diphenyl carbodiimide, 2,2'-dicyano-diphenyl carbodiimide, and combinations thereof, present in an amount from about 0.01 weight percent to about 20 weight percent of the latex particles.

4. A process according to claim 1, wherein the latex particles having a stabilizing agent comprising a carbodiimide exhibit a percentage change in pH of from about 0 to about less than 10 percent when stored for a period of time of from about 0 days to about 38 days, compared to latex particles having no stabilizing agent which exhibit a percentage change in pH greater than 10 percent when stored for a period of time of from about 0 days to about 38 days.

5. A process according to claim 1, wherein the latex particles having a stabilizing agent comprising a carbodiimide exhibit a percentage change in molecular weight of from about 0 to about 30 percent when stored for a period from about 0 days to about 70 days, compared to latex particles containing no stabilizing agent which exhibit a percentage change in molecular weight greater than 30 percent when stored for a period of from about 0 days to about 70 days.

6. A process according to claim 1, further comprising forming a shell over the latex particles to form toner particles, wherein the shell is present in an amount form about 1 weight percent to about 80 weight percent of the toner particles.

7. A process according to claim 6, wherein the at least one polyester resin comprises a crystalline resin including acidic groups with an acid number from about 5 mg KOH/g polymer to about 50 mg KOH/g polymer present in an amount from about 1 weight percent to about 85 weight percent of the toner particles.

8. A process according to claim 1, wherein the latex particles have a solids content from about 10% to about 50%, and a particle size from about 10 nm to about 500 nm.

9. A process according to claim 1, further comprising distilling the organic solvent from the emulsion.

10. A process comprising:
contacting at least one crystalline polyester resin and an optional amorphous resin with at least one organic solvent, and a stabilizing agent selected from the group consisting of poly(nitrilomethanetetraylnitrilo (2,4,6-tris(1-methylethyl)-1,3-phenylene), tetraisopropyldiphenylcarbodiimide, 2,2',6,6'-tetraisopropyldiphenyl carbodiimide, N,N'-dicyclohexylcarbodiimide, N,N'-diisopropylcarbodiimide, 1-ethyl-3-(3-dimethylaminopropyl)carbodiimide, tetramethylxylylene carbodiimide, diisopropylcarbodiimide, methyl-tert-butyl-carbodiimide, dicyclohexyl-carbodiimide, diphenyl-carbodiimide, di-p-tolyl-carbodiimide, 2,2'-dimethyl-diphenyl carbodiimide, 2,2'-diisopropyl-diphenyl carbodiimide, 2-dodecyl-2'-n-propyl-diphenyl carbodiimide, 2,T-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyldiphenyl carbodiimide, 2,2'-dinitro-diphenyl carbodiimide, 2-ethyl-2'-isopropyl-diphenyl carbodiimide, 2,6,2',6'-tetraethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetra-ethyl-dicyclohexyl carbodiimide, 2,2'-dichlorodicyclohexyl carbodiimide, 2,2'-dicarbethoxy-diphenyl carbodiimide, 2,2'-dicyano-diphenyl carbodiimide, and combinations thereof, to form a resin mixture;
mixing the resin mixture;
contacting the mixture with a neutralizing agent to form a neutralized mixture;
contacting the neutralized mixture with de-ionized water to form an emulsion;
recovering latex particles from the emulsion; and
contacting the latex particles with an optional colorant, an optional wax, and an amorphous polyester resin to form toner particles.

11. A process according to claim 10, further comprising distilling the organic solvent from the emulsion.

12. A process according to claim 10, wherein the at least one organic solvent is selected from the group consisting of an alcohol, ester, ether, ketone, an amine, and combinations thereof, in an amount of from about 1 weight percent to about 100 weight percent of the polyester resin; wherein the stabilizing agent is present in an amount from about 0.01 weight percent to about 20 weight percent of the latex particles, and wherein the neutralizing agent raises the pH of the resin mixture to from about 5 to about 12 and is added in the form of an aqueous solution selected from the group consisting of ammonium hydroxide, potassium hydroxide, sodium hydroxide, sodium carbonate, sodium bicarbonate, lithium hydroxide, potassium carbonate, organoamines, and combinations thereof.

13. A process according to claim 10, wherein the at least one crystalline polyester resin is an unsaturated crystalline polyester resin including acidic groups with an acid number from about 5 to about 50 mg KOH/g polymer present in an amount from about 1 weight percent to about 85 weight percent of the toner particles; and wherein the amorphous polyester resin forms a shell over the latex particles and is present in an amount from about 1 weight percent to about 80 weight percent of the toner particles.

14. A process according to claim 10, wherein the latex particles have a solids content from about 10% to about 50%, and wherein the latex particles have a particle size from about 10 nm to about 500 nm.

15. A process according to claim 10, wherein the latex particles having a stabilizing agent exhibit a percentage change in pH of from about 0 to about less than 10 percent when stored for a period of time of from about 0 days to about 38 days, compared to latex particles having no stabilizing agent which exhibit a percentage change in pH greater than 10 percent when stored for a period of time of from about 0 days to about 38 days.

16. A process according to claim 10, wherein the latex particles having a stabilizing agent exhibit a percentage change in molecular weight of from about 0 to about 30 percent when stored for a period from about 0 days to about 70 days, compared to latex particles containing no stabilizing agent which exhibit a percentage change in molecular weight greater than 30 percent when stored for a period of from about 0 days to about 70 days.

17. A process comprising: contacting at least one crystalline polyester resin and optional amorphous resins with at least one organic solvent, and a stabilizing agent comprising a carbodiimide selected from the group consisting of poly (nitrilomethanetetraylnitrilo (2,4,6-tris(1-methylethyl)-1,3-phenylene), tetraisopropyldiphenylcarbodiimide, 2,2',6,6'-tetraisopropyldiphenyl carbodiimide, N,N'-dicyclohexylcarbodiimide, N,N'-diisopropylcarbodiimide, 1-ethyl-3-(3-dimethylaminopropyl)carbodiimide, tetramethylxylylene carbodiimide, diisopropylcarbodiimide, methyl-tert-butyl-carbodiimide, dicyclohexyl-carbodiimide, diphenyl-carbodiimide, di-p-tolyl-carbodiimide, 2,2'-dimethyl-diphenyl carbodiimide, 2,2'-diisopropyl-diphenyl carbodiimide, 2-dodecyl-2'-n-propyl-diphenyl carbodiimide, 2,2'-diethoxy-diphenyl carbodiimide, 2-0-dodecyl-2'-0-ethyl-diphenyl carbodiimide, 2,2'-dichlorodiphenyl carbodiimide, 2,2'-ditolyl-diphenyl carbodiimide, 2,2'-dibenzyl-diphenyl carbodiimide, 2,2'-dinitro-diphenyl carbodiimide, 2-ethyl-2'-isopropyl-diphenyl carbodiimide, 2,6,2',6'-tetra-ethyl-diphenyl carbodiimide, 2,6,2',6'-tetra-secondary-butyl-diphenyl carbodiimide, 2,6,2',6'-tetraethyl-3,3'-dichloro-diphenyl carbodiimide, 2,6,2',6'-tetraisopropyl-3,3'-dinitro-diphenyl carbodiimide, 2-ethyl-cyclohexyl-2-isopropyl-phenyl carbodiimide, 2,4,6,2',4',6'-hexaisopropyl-diphenyl carbodiimide, 2,2'-diethyl-dicyclohexyl carbodiimide, 2,6,2',6'-tetraisopropyl-dicyclohexyl carbodiimide, 2,6,2',6'-tetra-ethyl-dicyclohexyl carbodiimide, 2,2'-dichlorodicyclohexyl carbodiimide, 2,2'-dicarbethoxy-diphenyl carbodiimide, 2,2'-dicyano-diphenyl carbodiimide, and combinations thereof, to form a stabilized mixture;

mixing the stabilized mixture;
    contacting the stabilized mixture with a neutralizing agent to form a neutralized mixture;
    contacting the neutralized mixture with de-ionized water to form an emulsion;
    distilling the organic solvent from the emulsion;
    recovering latex particles from the emulsion; and
    contacting the latex particles with an optional colorant, an optional wax, an optional additive, and an amorphous polyester resin to form toner particles.

18. A process according to claim 17, wherein the at least one organic solvent is selected from the group consisting of an alcohol, ester, ether, ketone, an amine, and combinations thereof, in an amount of from about 1 weight percent to about 100 weight percent of the polyester resin; wherein the stabilizing agent is present in an amount from about 0.01 weight percent to about 20 weight percent of the latex particles, and wherein the neutralizing agent is added in the form of an aqueous solution selected from the group consisting of ammonium hydroxide, potassium hydroxide, sodium hydroxide, sodium carbonate, sodium bicarbonate, lithium hydroxide, potassium carbonate, organoamines, and combinations thereof, and raises the pH of the resin mixture to from about 5 to about 12.

19. A process according to claim 17, wherein the latex particles having a stabilizing agent exhibit a percentage change in pH of from about 0 to about less than 10 percent when stored for a period of time of from about 0 days to about 38 days, compared to latex particles having no stabilizing agent which exhibit a percentage change in pH greater than 10 percent when stored for a period of time of from about 0 days to about 38 days.

20. A process according to claim 17, wherein the latex particles having a stabilizing agent exhibit a percentage change in molecular weight of from about 0 to about 30 percent when stored for a period from about 0 days to about 70 days, compared to latex particles containing no stabilizing agent which exhibit a percentage change in molecular weight greater than 30 percent when stored for a period of from about 0 days to about 70 days.

\* \* \* \* \*